US011571835B2

(12) United States Patent
Hiraiwa et al.

(10) Patent No.: US 11,571,835 B2
(45) Date of Patent: Feb. 7, 2023

(54) TRANSPORTING DEVICE AND KNEADING MACHINE WITH ROLLING ELEMENT

(71) Applicant: SEIKO EPSON CORPORATION, Tokyo (JP)

(72) Inventors: Takashi Hiraiwa, Fujimi-machi (JP); Makoto Omura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 268 days.

(21) Appl. No.: 17/030,443

(22) Filed: Sep. 24, 2020

(65) Prior Publication Data

US 2021/0094203 A1    Apr. 1, 2021

(30) Foreign Application Priority Data

Sep. 26, 2019  (JP) .............................. JP2019-175244

(51) Int. Cl.
| | | |
|---|---|---|
| *B29B 7/40* | (2006.01) | |
| *B29B 7/48* | (2006.01) | |
| *B29B 7/52* | (2006.01) | |
| *B29C 35/02* | (2006.01) | |
| *B29B 7/42* | (2006.01) | |

(52) U.S. Cl.
CPC .............. *B29B 7/408* (2013.01); *B29B 7/428* (2013.01); *B29B 7/48* (2013.01); *B29B 7/488* (2013.01); *B29B 7/52* (2013.01); *B29C 35/02* (2013.01); *B29C 2035/0283* (2013.01)

(58) Field of Classification Search
CPC ........... B29B 7/408; B29B 7/428; B29B 7/48; B29B 7/52; B29B 7/488; B29B 7/60; B29B 7/826; B29B 7/422; B29C 35/02; B29C 2035/0283; B29C 48/288; B29C 48/766; B29C 48/802; B29C 48/832; B29C 48/2552
USPC ...................................... 366/79–85
See application file for complete search history.

(56) References Cited

U.S. PATENT DOCUMENTS

| | | | | |
|---|---|---|---|---|
| 603,411 | A * | 5/1898 | Rutschman ........... | B29C 48/395 418/220 |
| 3,149,377 | A * | 9/1964 | Reynolds .............. | B29C 45/581 425/207 |
| 3,477,698 | A * | 11/1969 | Webster ................. | B29C 48/29 425/200 |
| 3,530,534 | A * | 9/1970 | Pomper ................. | B29C 48/395 425/208 |
| 3,944,192 | A * | 3/1976 | Farrell .................. | B29C 48/565 425/208 |
| 3,998,439 | A * | 12/1976 | Feix ....................... | B29C 48/29 366/77 |
| 4,530,605 | A * | 7/1985 | Eichlseder ............. | B29C 45/52 366/77 |

(Continued)

FOREIGN PATENT DOCUMENTS

| | | |
|---|---|---|
| JP | H08-244026 A | 9/1996 |
| JP | 2003-098733 A | 4/2003 |

*Primary Examiner* — Charles Cooley
(74) *Attorney, Agent, or Firm* — Global IP Counselors, LLP

(57) ABSTRACT

A hopper charged with a powder material, a screw arranged below the hopper and exposed at a supply port formed at the bottom of the hopper, and a rolling element in contact with the screw at the supply port are provided. The rolling element is larger than a space between end portions of the supply port and a screw groove of the screw.

10 Claims, 4 Drawing Sheets

(56) References Cited

U.S. PATENT DOCUMENTS

| | | | |
|---|---|---|---|
| 5,129,728 A * | 7/1992 | Winstead | B29B 7/823 366/97 |
| 11,440,221 B2 * | 9/2022 | Conrad | B29C 48/2715 |
| 2006/0118989 A1 * | 6/2006 | Shinbach | B29C 48/297 264/102 |
| 2021/0094203 A1 * | 4/2021 | Hiraiwa | B29B 7/52 |

* cited by examiner ature by heating and melting.
TRANSPORTING DEVICE AND KNEADING MACHINE WITH ROLLING ELEMENT The present application is based on, and claims priority from JP Application Serial Number 2019-175244, filed Sep. 26, 2019, the disclosure of which is hereby incorporated by reference herein in its entirety.

BACKGROUND

1. Technical Field

The present disclosure relates to a transporting device and a kneading machine.

2. Related Art

Generally, there is known a kneading machine that includes a hopper, a screw arranged below the hopper, and a casing rotatably accommodating the screw and that kneads, by using the screw, a powder material charged into the hopper.

In such a kneading machine, air contained in the powder material may be sent with the powder material to the inside of the casing, may accumulate therein, and may become a resistance when the powder material is fed by the screw. In such a case, the charged powder material is not supplied to the screw and is unable to be kneaded.

Therefore, in the kneading machine as described above, a compressor is provided, and the powder material before being charged into the casing is compressed by the compressor to remove air contained in the powder material, thereby suppressing air that remains in the casing.

Further, in the kneading machine as described above, the casing is provided with a vent port for deaeration equipped with a vacuum pump or the like, and by extracting air inside the casing by using the vacuum pump, air that remains in the casing is suppressed (see, for example, JP-A-2003-98733).

However, in the configuration according to the related art, a kneading machine may be large due to a compressor or a vacuum pump or the like being provided. Further, such configuration may be difficult to be applied to a kneading machine that is small in size.

SUMMARY

An aspect of the present disclosure is a transporting device including a hopper charged with a powder material, a screw arranged below the hopper and exposed at a supply port formed at the bottom of the hopper, and a rolling element in contact with the screw at the supply port, the rolling element being larger than a space between an end portion of the supply port and a groove of the screw.

In the transporting device, the minimum length of the rolling element in the radial direction may be greater than a distance between the end portion of the supply port and the groove of the screw.

In the transporting device, the maximum length of the rolling element may be less than a pitch of the screw.

In the transporting device, the maximum length of the rolling element may be less than the maximum opening width of the supply port.

The transporting device may further include a casing to accommodate the screw. The casing may be in communication with the hopper through the supply port, and the minimum length of the rolling element in the radial direction may be greater than a distance between an inner wall of the casing and the groove of the screw.

In the transporting device, a surface of the rolling element may be formed to be softer than a surface of the screw.

In the transporting device, the rolling element may be formed of the powder material.

An aspect of the present disclosure is a kneading machine that transports a powder material by using a transporting device and kneads the powder material. The kneading machine includes the transport device including a hopper charged with a powder material, a screw arranged below the hopper and exposed at a supply port opening at the bottom of the hopper, and a rolling element in contact with the screw at the supply port, the rolling element being larger than a space between an end portion of the supply port and a groove of the screw.

In the kneading machine, the powder material may be kneaded by heating and melting.

In the kneading machine, the rolling element may be a thermoplastic resin, and a softening temperature of the rolling element may be equal to or higher than a softening temperature of the powder material.

DESCRIPTION OF EXEMPLARY EMBODIMENTS

Hereinafter, a preferred embodiment of the present disclosure will be explained in detail with reference to the drawings. In the present embodiment, a kneading machine to which a transporting device is applied will be explained. In addition, embodiments explained below should not limit the scope of the present disclosure described in Claims. Further, the constituent features of the present disclosure are not limited to encompassing the entire configuration explained below.

Figure 1:
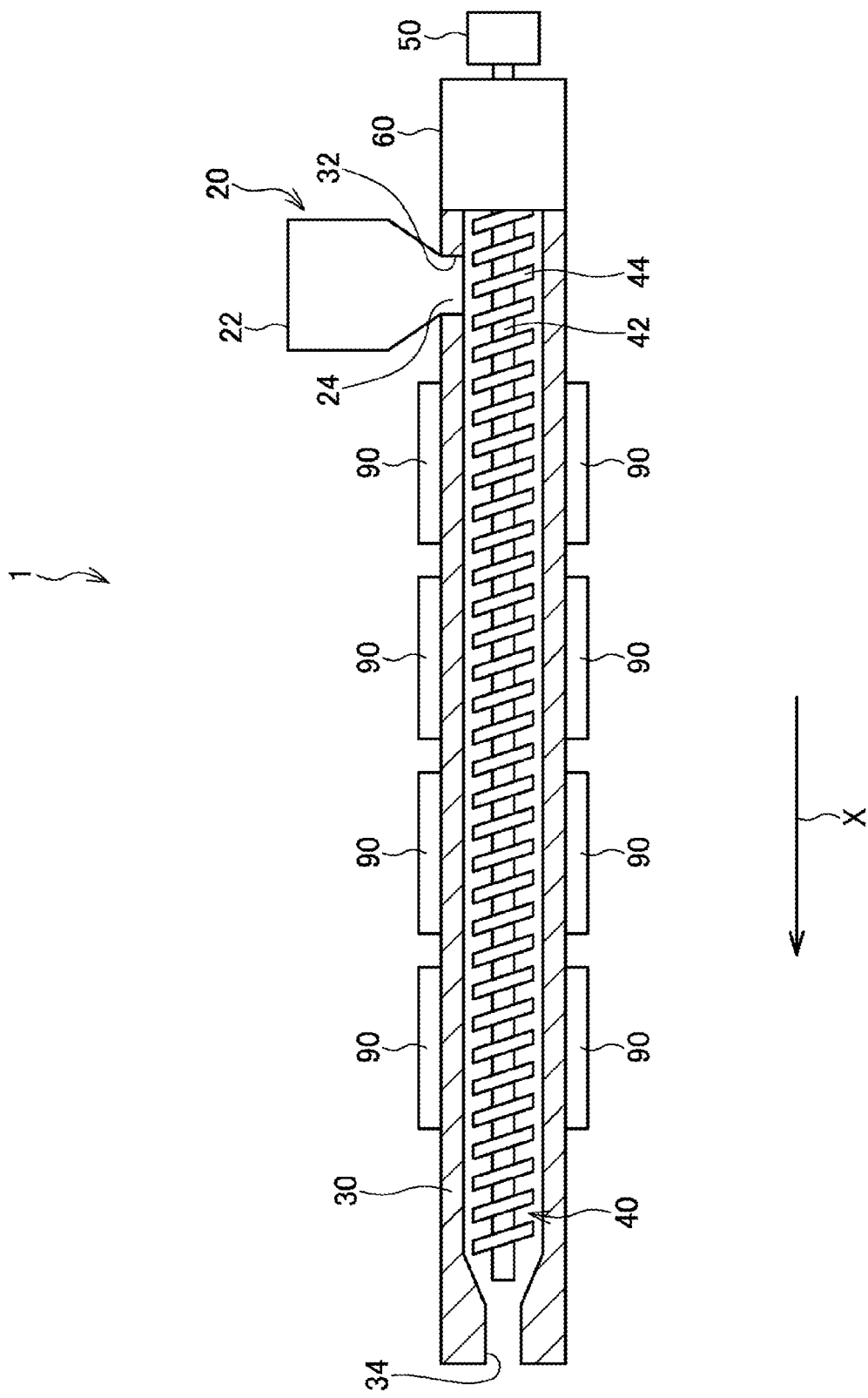
FIG. 1 is a side view illustrating a schematic configuration of a kneading machine according to an embodiment of the present disclosure.
Figure 2:
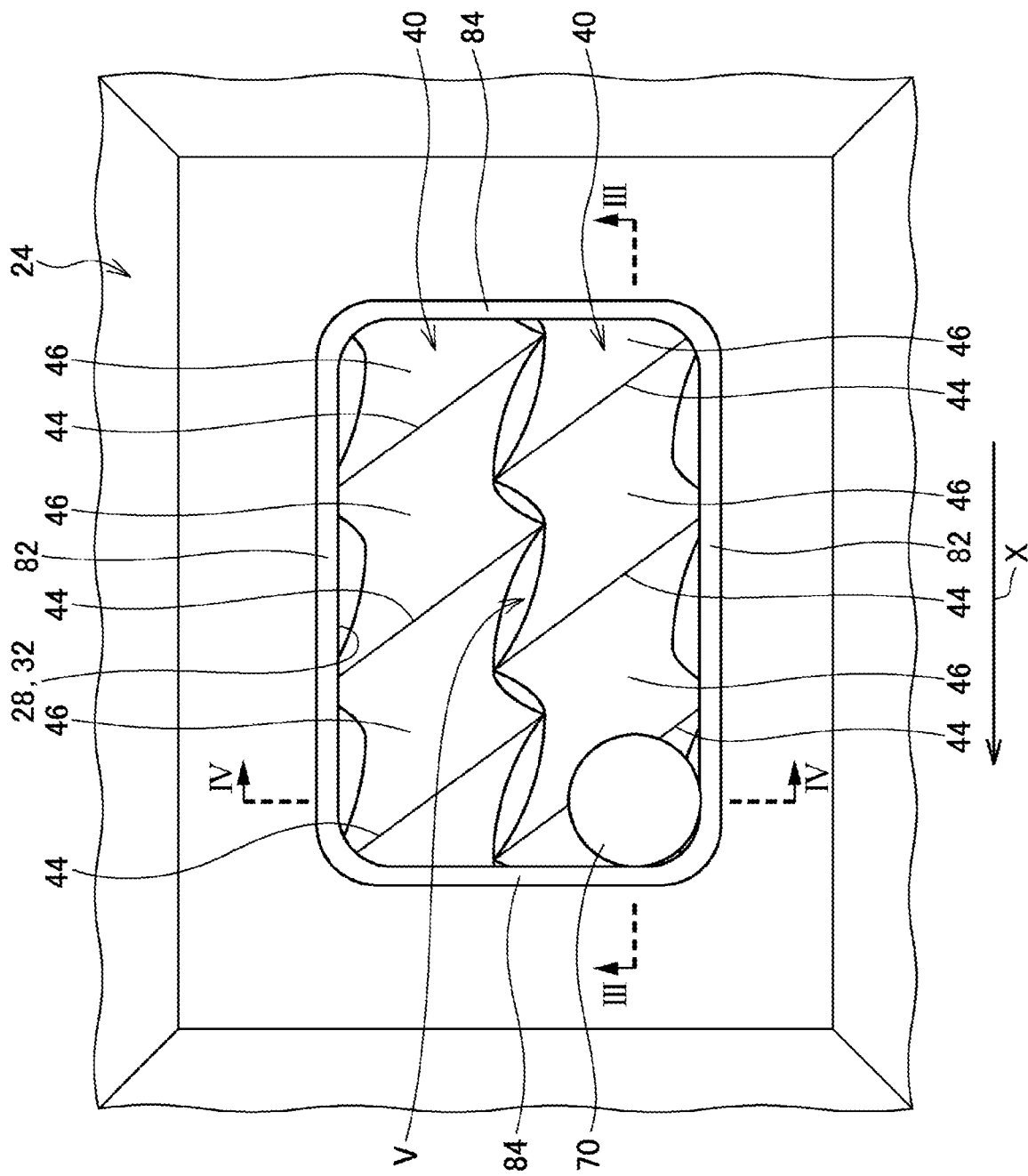
FIG. 2 is a sectional top view illustrating a lower end of a hopper.
Figure 3:
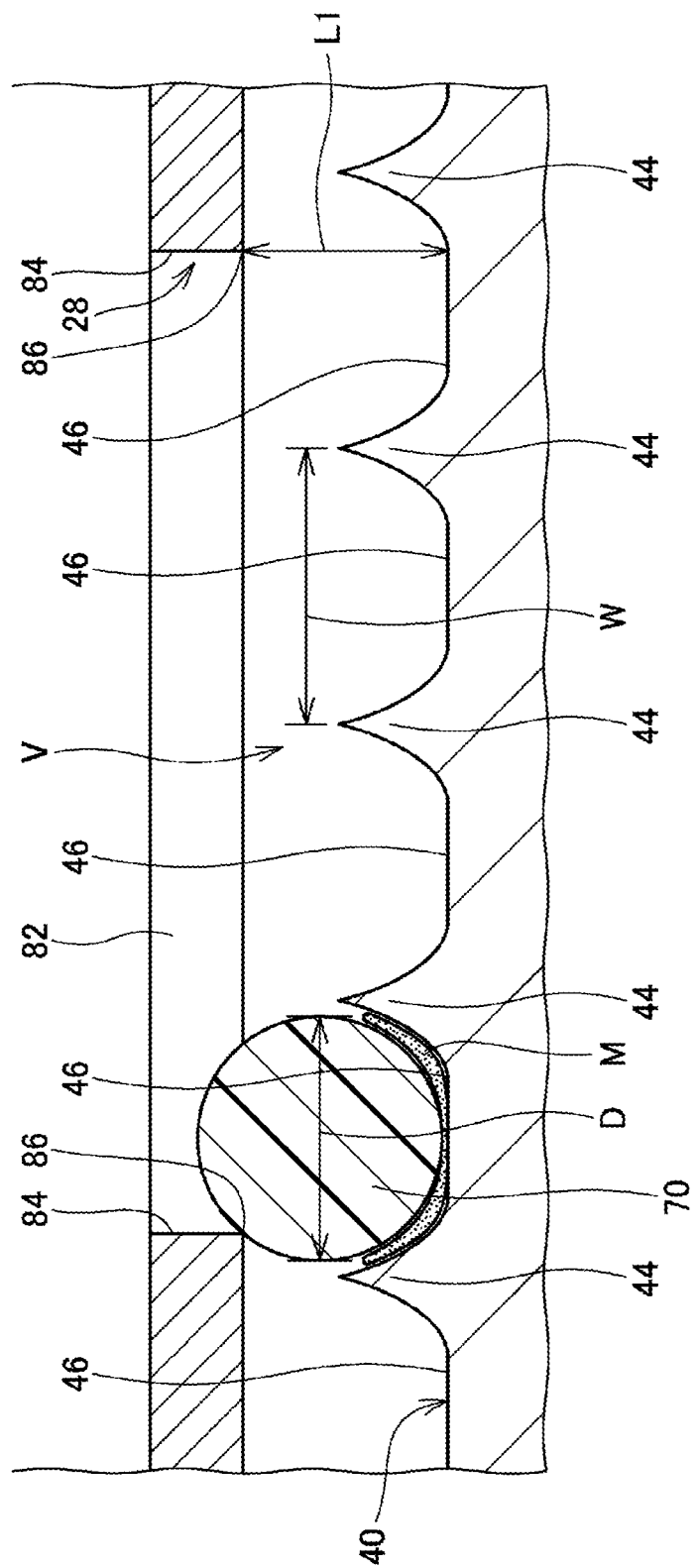
FIG. 3 is a sectional view taken along line III-III in FIG. 2.
Figure 4:
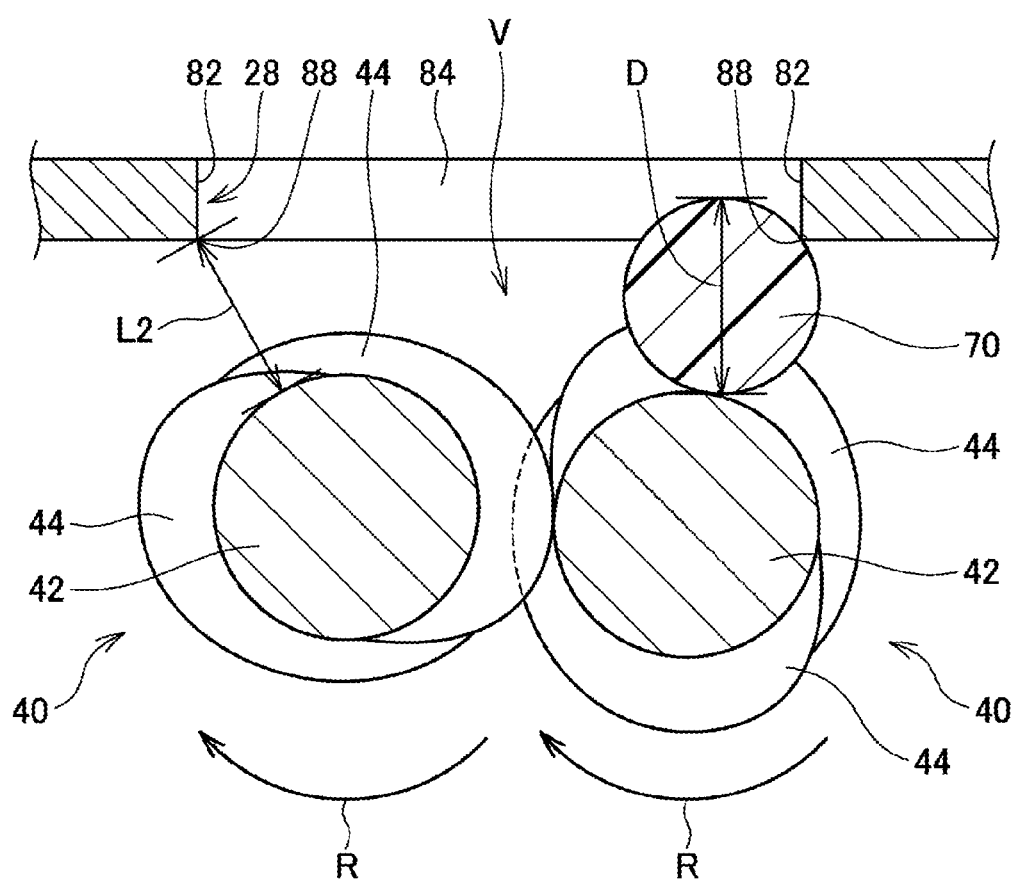
FIG. 4 is a sectional view taken along line IV-IV in FIG. 3.

FIG. 1 is a side view illustrating a schematic configuration of a kneading machine 1 according to an embodiment of the present disclosure and FIG. 2 is a sectional top view illustrating a lower end of a hopper 20. Further, FIG. 3 is a sectional view taken along line III-III in FIG. 2 and FIG. 4 is a sectional view taken along line IV-IV in FIG. 2. In addition, in FIG. 1, only a casing 30 is illustrated in sectional view.

The kneading machine 1 according to the embodiment of the present disclosure includes a transporting device provided with a heating device and is a twin-shaft kneading machine that heats the supplied powder material M and then performs kneading. The kneading machine makes the kneaded powder material into a block having plasticity and discharges the block.

In FIG. 1, a direction in which the kneading machine 1 transports the powder material M is referred to as a transport direction X. Further, the powder material M according to an embodiment of the present disclosure is a fine polyester powder having thermoplasticity that melts at a predetermined temperature.

The kneading machine 1 includes a casing 30 extending in the transport direction X. The casing 30 is formed with an internal space entirely in the longitudinal direction in which the powder material M is kneaded. An upper surface opening 32 in communication with the internal space is provided in an upper surface of the casing 30 upstream in the transport direction X. A discharge port 34 in communication with the internal space is provided in an end surface of the casing 30 located downstream in the transport direction X.

The kneading machine 1 is provided, upstream in the transport direction X and in an upward direction, with a hopper 20 that stores the charged powder material M. The hopper 20 is attached to the casing 30 by inserting a lower end portion 24 of the hopper 20 into an upper surface opening 32. The hopper 20 is provided with a charge port 22 in an upper surface thereof, and further, as illustrated in FIG. 2, the hopper 20 is provided with a supply port 28 at the bottom of the lower end portion 24. An inner space of the hopper 20 and the internal space of the casing 30 communicate with each other via the supply port 28. The supply port 28 of the present embodiment has a rectangular shape in plan view, and the supply port 28 has a long side 82 and a short side 84. The long side 82 extends in the transport direction X.

A pair of screws 40 both extending in the longitudinal direction of the casing 30 are rotatably accommodated in the internal space of the casing 30. Each screw 40 is arranged at a predetermined interval between an inner wall of the casing 30 and the screw 40. Each screw 40 has a screw shaft 42 and blades 44 forming the shape like a helix provided on the entire outer peripheral surface of the screw shaft 42 in the longitudinal direction. Further, on each screw shaft 42, the portion between adjacent blades 44 is a screw groove 46.

Each screw 40 is arranged horizontally adjacent to the other screw 40, and as illustrated in FIG. 2, each blade 44 of each screw 40 is arranged so as to enter the screw groove 46 of the other screw 40. Further, each screw 40 is exposed at the supply port 28 to the hopper 20. Each screw of the pair of screws 40 of the present embodiment is formed of a metal material.

At an upstream end of the casing 30, a drive motor 50, which is a power mechanism, and a power transmission mechanism 60 are provided. The drive motor 50 is coupled to each screw 40 through the power transmission mechanism 60. The drive motor 50 rotationally drives, through the power transmission mechanism 60, each screw 40 at a predetermined reduction ratio. In the present embodiment, as illustrated in FIG. 4, each screw 40 rotates in the same rotation direction R.

On the outer peripheral surface of the casing 30, a plurality of heating devices 90 that heat the powder material M to be kneaded in the internal space of the casing 30 are provided. For these heating devices 90, for example, band heaters, electric heating blocks, heating jackets, and the like are used. The heating devices 90 maintain the temperature of the internal space of the casing 30 at around a softening temperature of the powder material M.

Inside the hopper 20, a rolling element 70 is accommodated and is able to roll. The rolling element 70 of the present embodiment is molded by solidifying the powder material M into a substantially spherical form, and a softening temperature of the rolling element 70 is equal to or higher than the softening temperature of the powder material M. Therefore, softening of the rolling element 70 is suppressed even when the kneading machine 1 is operated.

The maximum length of the rolling elements 70 and a diameter D, which is the minimum length in the radial direction, as illustrated in FIG. 3, are less than the distance between the blades 44 of each screw 40, that is, a pitch W which is a dimension of the screw groove 46. Further, a diameter D, as illustrated in FIG. 3, is greater than a distance L1 between an end portion 86 located below the short side 84 of the supply port 28 and the upper surface of the screw groove 46. Similarly, as illustrated in FIG. 4, the diameter D is greater than a distance L2 between an end portion 88 located below a long side 82 of the screw 40 and the upper surface of the screw groove 46. Furthermore, the diameter D is greater than a width dimension of a gap located between the pair of screws 40.

In the hopper 20, the rolling element 70 is located in a space V formed between the supply port 28 and each screw 40 as a result of the flow of the powder material M to be charged and the rotational driving of each screw 40 and is transported in the transport direction X while rolling on each screw 40. Since the diameter D of the rolling element 70 is less than the pitch W, the rolling element 70 is transported in the transport direction X in a state of being accommodated in the screw groove 46.

Since the diameter D of the rolling element 70 is greater than the distances L1 and L2, the rolling element 70 does not enter a space between the screw 40 and the supply port 28. Therefore, the transported rolling element 70 abuts both the end portion 86 of the short side 84 located downstream of the supply port 28 in the transport direction X and the end portion 88 of the long side 82 located on the front side of the supply port 28 in the rotation direction R when viewed from the upper surface side of each screw 40. As illustrated in FIG. 2, the rolling element 70 that abuts each side of the supply port 28 remains in the space V near a corner of the supply port 28 formed by the short side 84 and the long side 82 in top view of the bottom of the hopper 20.

As described above, the surface of the rolling element 70 is formed of a material softer than the surface of each screw 40. Therefore, wear of each screw 40 by the rolling element 70 can be suppressed. Further, since the rolling element 70 rolls while in contact with the screw 40 or each of the end portions 86 and 88 of the supply port 28, the rolling element 70 may become worn and decompose. Even in such a case, since the rolling element 70 is formed of the same material as the powder material M, work to remove the rolling element 70 from the internal space of the casing 30 or from a product of the kneading machine becomes unnecessary.

Next, the operation of the present embodiment will be described. When the powder material M is charged into the hopper 20, the powder material M is supplied to the internal space of the casing 30 through the supply port 28 and is transported to a discharge port 34 by each screw 40 rotating. At this time, the powder material M is kneaded while being heated by the heating devices 90.

Since the charged powder material M contains air, in a kneading machine according to the related art, as the powder material M is transported, air flowing with the powder material M remains in the internal space of the casing 30. As a result, the powder material M might not enter the internal space of the casing 30 and might remain at the bottom, and the transportation might not proceed. In such a case, it was recognized that the powder material M accumulated from near a corner of the supply port 28 formed by the short side 84 located downstream of the supply port 28 in the transport direction X and the long side 82 located on the front side in the rotation direction R on the upper surface side of each screw 40.

As described above, in the kneading machine 1 of the present embodiment, the rolling element 70 is transported while rolling in the space V formed between the screw 40 and the end portions 86 and 88 of the supply port 28. After the rolling element 70 is transported while rolling in the state of being accommodated in the screw groove 46, the rolling element 70 is accommodated in the screw groove 46 by being abutted against the end portions 86 and 88 and continues rolling. The powder material M charged into the space V from the supply port 28 is drawn in response to the rolling motion of the rolling element 70 accommodated in the screw groove 46 and the rotation of the screw 40—the so-called wedge effect—to a space between the rolling element 70 and the screw groove 46. At this time, the powder material M is pressed between the rolling element 70 and the upper surface of the screw groove 46 and between the rolling element 70 and each side surface of the blade 44 located on either side of the screw groove 46. Then, as a result of the powder material M being pressed in this manner, air contained in the powder material M is released to the inside of the hopper 20.

As a result, the powder material M from which air has been released is supplied to the internal space of the casing 30, and inflow of air into the internal space of the casing 30 can be suppressed. Therefore, without using a mechanism such as a pump or a compressor, inflow of air into the internal space of the casing 30 can be suppressed, and air remaining in the internal space of the casing 30 can be suppressed. Further, regardless of the scale of the kneading machine 1, air remaining in the internal space of the casing 30 can be suppressed.

Further, since the rolling element 70 of the present embodiment is formed larger than the space V as described above, the rolling element 70 remains in the space V while rolling on the screw groove 46. As a result, the powder material M from which air has been released is continuously discharged to the internal space of the casing 30 by each screw 40. Thus, air can be constantly released from the powder material M charged into the hopper 20, and the powder material M can be continuously charged.

According to the above-described embodiment, the following effects can be obtained. The kneading machine 1 includes a kneading machine 1 having a hopper 20 charged with the powder material M, a screw 40 arranged below the hopper 20 and exposed at a supply port 28 formed at the bottom of the hopper 20, and a rolling element 70 in contact with the screw 40 at the supply port 28. Further, the rolling element 70 is formed to be larger than a space V between each of the end portions 86 and 88 of the supply port 28 and the screw groove 46 of the screw 40. As a result, the rolling element 70 remains in the space V while rolling on the upper surface of the screw groove 46, presses the powder material M that has entered a space between the rolling element 70 and the screw groove 46, and releases air contained in the powder material M to the inside of the hopper 20. Thus, the kneading machine 1 can discharge air contained in the powder material M without using a mechanism such as a vent port, a pump, a compressor, or the like, inflow of air into the internal space of the casing 30 can be suppressed, and air remaining in the internal space of the casing 30 can be suppressed.

Further, the diameter D of the rolling element 70 is set to be greater than the distances L1 and L2. As a result, the rolling element 70 abuts the end portion 86 and the end portion 88 and can remain in the space V while rolling on the screw groove 46 without being discharged to the internal space of the casing 30.

Further, the diameter D of the rolling elements 70 is set to be less than the pitch W. As a result, the rolling element 70 is accommodated in the screw groove 46 and presses the powder material M that has entered a space between the rolling element 70 and the screw groove 46 more effectively, and air contained in the powder material M can be efficiently released.

Further, the diameter D of the rolling element 70 is set to be less than the opening width of the supply port 28. As a result, the rolling element 70 can press the powder material M against the screw 40 and discharge air contained in the powder material M without blocking the supply port 28.

Further, the surface of the rolling element 70 is formed to be softer than the surface of the screw 40. As a result, wear of the respective screw 40 by the rolling element 70 can be suppressed.

Further, the rolling element 70 is formed of the powder material M. As a result, even if the rolling element 70 becomes worn and decomposes, work to remove the rolling element 70 from the internal space of the casing 30 or from a product of the kneading machine 1 can be avoided.

Further, the kneading machine 1 is configured such that the kneading machine 1 kneads the powder material M by heating and melting, the rolling element 70 is a thermoplastic resin, and a softening temperature of the rolling element 70 is equal to or higher than a softening temperature of the powder material M. As a result, even when the kneading machine 1 operates and the internal space of the casing 30 is heated by the heating devices 90, softening of the rolling element 70 is suppressed.

The above-described embodiment exemplifies one aspect of the present disclosure and can appropriately be modified and applied without departing from the spirit of the present disclosure.

In the above-described embodiment, the rolling element 70 has a substantially spherical form but is not limited to this, and any form, such as an ellipsoid, an ovoid, or a substantially spherical form having irregularities on the surface, may be used as long as it enables the rolling element 70 to roll on the screw 40.

The rolling element 70 as described above is formed such that the minimum length in the radial direction is greater than the distances L1 and L2. As a result, while the rolling element 70 having the above-described shape can remain in the space V, the powder material M is pressed between the rolling material 70 and the screw groove 46 of the screw 40 so as to discharge air contained in the powder material M.

Further, in the above-described embodiment, the size of the rolling element 70 is set such that the rolling element 70 can be accommodated in the screw groove 46. However, not limited to this, the rolling element 70 may be formed to be larger than the pitch W, as long as the maximum length is less than an opening width of the supply port 28 and small enough not to block the entire supply port 28. Even in such a case, the powder material M that has entered a space between the rolling element 70 and the screw groove 46 is pressed by the rolling element 70, and air contained in the powder material M can be released. Similarly, a plurality of rolling elements 70 may be accommodated at the bottom as long as the number of rolling elements 70 is small enough not to block the entire supply port 28.

Further, in the above-described embodiment, the lower end portion 24 of the hopper 20 is inserted into the upper surface opening 32. However, not limited to this, the hopper 20 may be mounted on the upper surface of the casing 30, the lower end portion 24 may be coupled to the upper surface opening 32, and the upper surface opening 32 may be provided below the supply port 28. In this case, the rolling element 70 rolls on each screw 40 in the space between the upper surface opening 32 and each screw 40. Further, the diameter D of the rolling element 70 is set to be greater than the distance between the inner wall of the casing 30 and the screw groove 46 of the screw 40. As a result, the rolling element 70 abuts an end portion of the upper surface opening 32 and is not discharged to the internal space of the casing 30, but rolls on the screw groove 46 and can remain in the space between the upper surface opening 32 and each screw 40.

Although the rolling element 70 of the present embodiment is formed of the same material as the powder material M but is not limited to this, as long as the material forming the surface is softer than each screw 40, the rolling element 70 may be formed of any material. For example, the rolling element 70 may be formed of silicon nitride, which is softer than the screw 40 and has higher durability than a polyester resin. By using silicon nitride, wear of the rolling elements 70 can be suppressed.

In addition, in the above-described embodiment, the kneading machine 1 to which the present disclosure is applied has been described but is not limited to this and the present disclosure may be applied to an injection molding machine. Further, in the above-described embodiment, a twin-shaft kneading machine has been described but is not limited to this and the kneading machine may be a single-shaft or a multi-shaft kneading machine having three or more shafts.

What is claimed is:

1. A transporting device comprising:
    a hopper charged with a powder material;
    a pair of first and second screws arranged below the hopper and exposed at a supply port formed at a bottom of the hopper, each of the first and second screws including a screw shaft and blades, the screw shaft extending an axial direction of the screw shaft, the blades being disposed an outer peripheral surface of the screw shaft, the screw shaft of the first screw being spaced apart from the screw shaft of the second screw by at least a first distance as viewed in the axial direction, the first distance being a minimum distance between the outer peripheral surface of the screw shaft of the first screw and the outer peripheral surface of the screw shaft of the second screw as viewed in the axial direction; and
    a rolling element in contact with at least one of the first and second screws at the supply port, wherein
    the rolling element is larger than a space between an end portion of the supply port and a groove of each of the first and second screws, and
    a diameter of the rolling element is greater than the first distance as viewed in the axial direction.

2. The transporting device according to claim 1, wherein a minimum length of the rolling element in a radial direction, which is the diameter of the rolling element, is greater than a second distance between the end portion of the supply port and the groove of each of the first and second screws.

3. The transporting device according to claim 1, wherein a maximum length of the rolling element, which is the diameter of the rolling element, is less than a pitch of each of the first and second screws.

4. The transporting device according to claim 1, wherein a maximum length of the rolling element, which is the diameter of the rolling element, is less than a maximum opening width of the supply port.

5. The transporting device according to claim 1, further comprising:
    a casing accommodating the first and second screws, the casing in communication with the hopper through the supply port, wherein
    a minimum length of the rolling element in a radial direction, which is the diameter of the rolling element, is greater than a third distance between an inner wall of the casing and the groove of each of the first and second screws.

6. The transporting device according to claim 1, wherein a surface of the rolling element is softer than the outer peripheral surface of the first and second screws.

7. The transporting device according to claim 1, wherein the rolling element is formed of the powder material.

8. A kneading machine for kneading by transporting a powder material by using a transporting device, the kneading machine comprising:
    the transporting device including
    a hopper charged with the powder material,
    a pair of first and second screws arranged below the hopper and exposed at a supply port opening at a bottom of the hopper, each of the first and second screws including a screw shaft and blades, the screw shaft extending an axial direction of the screw shaft, the blades being disposed an outer peripheral surface of the screw shaft, the screw shaft of the first screw being spaced apart from the screw shaft of the second screw by at least a first distance as viewed in the axial direction, the first distance being a minimum distance between the outer peripheral surface of the screw shaft of the first screw and the outer peripheral surface of the screw shaft of the second screw as viewed in the axial direction, and
    a rolling element in contact with at least one of the first and second screws at the supply port, wherein
    the rolling element is larger than a space between an end portion of the supply port and a groove of each of the first and second screws, and
    a diameter of the rolling element is greater than the first distance as viewed in the axial direction.

9. The kneading machine according to claim 8, wherein the powder material is kneaded by heating and melting.

10. The kneading machine according to claim 9, wherein the rolling element is a thermoplastic resin, and
    a softening temperature of the rolling element is equal to or higher than a softening temperature of the powder material.

* * * * *